United States Patent [19]
O'Ryan et al.

[11] Patent Number: 5,782,943
[45] Date of Patent: Jul. 21, 1998

[54] INTEGRATED POWDER COLLECTION SYSTEM FOR PAINT SPRAY BOOTHS

[75] Inventors: David E. O'Ryan, Clarkston, Mich.; Richard D. Burke, Amherst, Ohio

[73] Assignee: ABB Flexible Automation Inc., New Berlin, Wis.

[21] Appl. No.: 695,861

[22] Filed: Aug. 9, 1996

[51] Int. Cl.⁶ .................................................. B01D 50/00
[52] U.S. Cl. ........................ 55/332; 55/334; 55/462; 55/DIG. 46
[58] Field of Search ................... 55/DIG. 46, 327, 55/320, 392, 332, 334; 118/326, DIG. 7; 95/278, 268; 261/DIG. 54

[56] References Cited

U.S. PATENT DOCUMENTS

| | | |
|---|---|---|
| 1,697,079 | 1/1929 | Onsrud. |
| 3,168,030 | 2/1965 | Wilhelmsson et al. ............ 55/DIG. 46 |
| 3,168,031 | 2/1965 | Wilhelmsson et al. ............ 55/DIG. 46 |
| 3,741,155 | 6/1973 | Hunder. |
| 3,921,576 | 11/1975 | Vertue. |
| 4,045,524 | 8/1977 | Bornert ............................ 261/DIG. 54 |
| 4,328,012 | 5/1982 | Telchuk, Jr. et al.. |
| 4,338,364 | 7/1982 | Kennon et al.. |
| 4,375,439 | 3/1983 | Hegemann et al. ............... 261/DIG. 54 |
| 4,409,009 | 10/1983 | Lissy ................................. 118/326 |
| 4,537,120 | 8/1985 | Josefsson. |
| 4,616,594 | 10/1986 | Itho. |
| 4,901,666 | 2/1990 | Nagasaka et al.. |
| 5,153,034 | 10/1992 | Telchuk et al.. |
| 5,178,679 | 1/1993 | Josefsson. |
| 5,591,240 | 1/1997 | Ophardt et al. ................... 55/DIG. 46 |

FOREIGN PATENT DOCUMENTS

| | | |
|---|---|---|
| 178 204 | 4/1986 | European Pat. Off. .......... 55/DIG. 46 |
| 2936367 | 9/1979 | Germany. |
| 1212617 | 10/1984 | U.S.S.R.. |
| 2160639 | 4/1985 | United Kingdom. |

Primary Examiner—Jay H. Woo
Assistant Examiner—Robert Hopkins
Attorney, Agent, or Firm—Harness, Dickey & Pierce, P.L.C.

[57] ABSTRACT

An integrated powder collection system for paint spray booths is provided for paint spray booths having a floor through which overspray and air are exhausted. The powder collection system includes at least two sloped surfaces disposed beneath the floor for defining at least one longitudinal slot therebetween. At least one longitudinal air slide is disposed beneath the at least one slot, and a pulsed vacuum source is connected to a filter cassette which is disposed beneath the floor and laterally to a side of a space defined vertically below the at least one longitudinal slot.

11 Claims, 4 Drawing Sheets

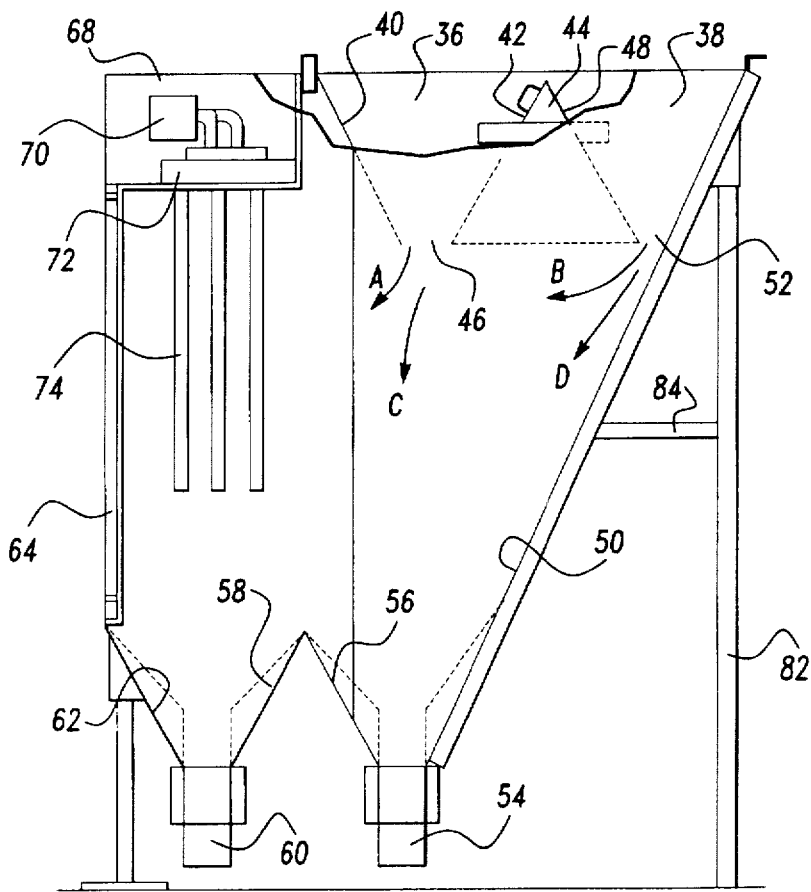
_Fig-2_
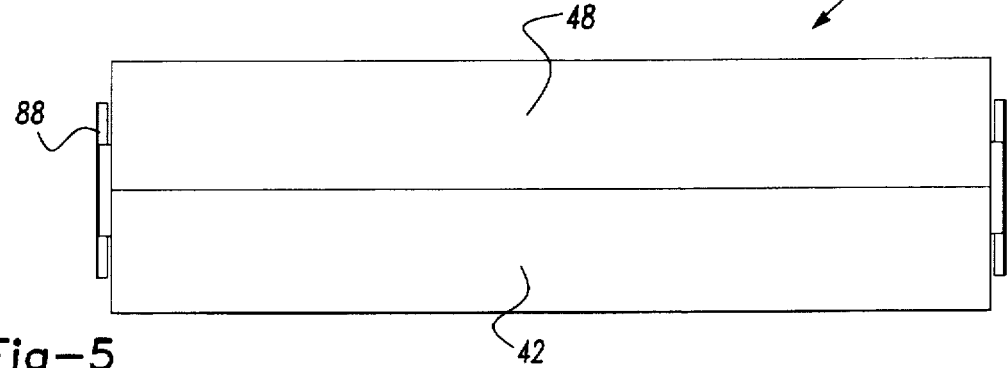
_Fig-5_
_Fig-6_

INTEGRATED POWDER COLLECTION SYSTEM FOR PAINT SPRAY BOOTHS

FIELD OF THE INVENTION

The present invention relates to a powder collection system for paint spray booths and, more specifically, to an integrated powder collection system for paint spray booths having at least one longitudinal slot which may be adjustable in width and a filter which is disposed off to a side of a space defined vertically below the longitudinal slot.

DESCRIPTION OF BACKGROUND ART

Designs of conventional paint spray booths have traditionally attempted to deal with improving paint transfer efficiency therein. Much of the paint spray, especially in powder spray booths, never reaches the target being painted and becomes so-called "overspray" which must be removed from an air stream in a paint spray booth. Overspray which is not properly removed from the air stream in the booth leads to build-up problems on the walls of the paint spray booth surrounding the paint spray application area.

In order to properly remove the overspray from the air stream in the booth, it is common to provide a plenum above the booth which supplies air pressure though the ceiling and sometimes through the walls of the booth, and the air is exhausted from the booth through the grated floor of the booth. A problem which must be effectively addressed for exhaust systems for powder spray booths is that the large amounts of air used for exhausting the paint spray booth is contaminated with "overspray". Thus, the air cannot be simply exhausted to the atmosphere because it would contaminate the environment. One such system is disclosed in U.S. Pat. No. 5,095,811 issued to Shutic et al on Mar. 17, 1992. In the exhaust system of U.S. Pat. No. 5,095,811 exhaust air mixed with powder overspray passes through gratings located along the floor and is directed from a space beneath the floor and through a plurality of conduits to a plurality of corresponding filters which are disposed below the space beneath the floor of the paint spray booth. A problem with the design of the above described exhaust system is that the conduits and filters consume a large amount of space below the paint spray booth.

Accordingly, it is desirable to provide an air filtering system which is capable of separating the "overspray" from the exhaust air which passes through the powder spray booth which has reduced spatial requirements beneath a floor of the paint spray booth.

SUMMARY OF THE INVENTION

Accordingly, it is an object of the present invention to provide a powder collection system integrated with a filter system for separating powder overspray from air which is exhausted from a paint spray booth which is reduced in size and simple in structure.

It is another object of the present invention to provide a powder collection system for paint spray booths which is capable of separating overspray from a large quantity of air which passes through the floor of the paint spray booth.

It is another object of the present invention to provide a powder collection system for paint spray booths which is capable of separating a large amount of overspray from the exhaust air prior to the exhaust air being filtered.

It is still another object of the present invention to provide a powder collection system for paint spray booths with a filter which is self cleaning.

These and other objects to the present invention are obtained by providing a powder collection system for paint spray booths having a floor through which overspray and air are exhausted, comprising: at least two sloped surfaces disposed beneath said floor for defining at least one longitudinal slot therebetween; at least one longitudinal air slide disposed beneath said at least one longitudinal slot; and a vacuum source connected to a filter cassette which is disposed beneath said floor and laterally to a side of a space defined vertically below said at least one longitudinal slot.

The objects of the present invention are also obtained by a method of separating powder overspray from exhaust air which passes through a floor of a powder spray booth, comprising the steps of: passing said exhaust air through a longitudinal slot disposed above an air slide; and providing a pulsed vacuum source connected to a filter which is disposed laterally to a side of a space defined vertically below said longitudinal slot for drawing exhaust air in a lateral direction toward said filter after being drawn through said longitudinal slot.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein:

FIG. 2 is a longitudinal end view of an integrated powder collection system for paint spray booths according to the principles of the present invention;

FIG. 5 is a top view of an interior deflection member according to the principles of the present invention;

FIG. 6 is an end view of the interior deflection member shown in FIG. 5;

DETAILED DESCRIPTION OF THE PREFERRED EMBODIMENTS

Figure 1:
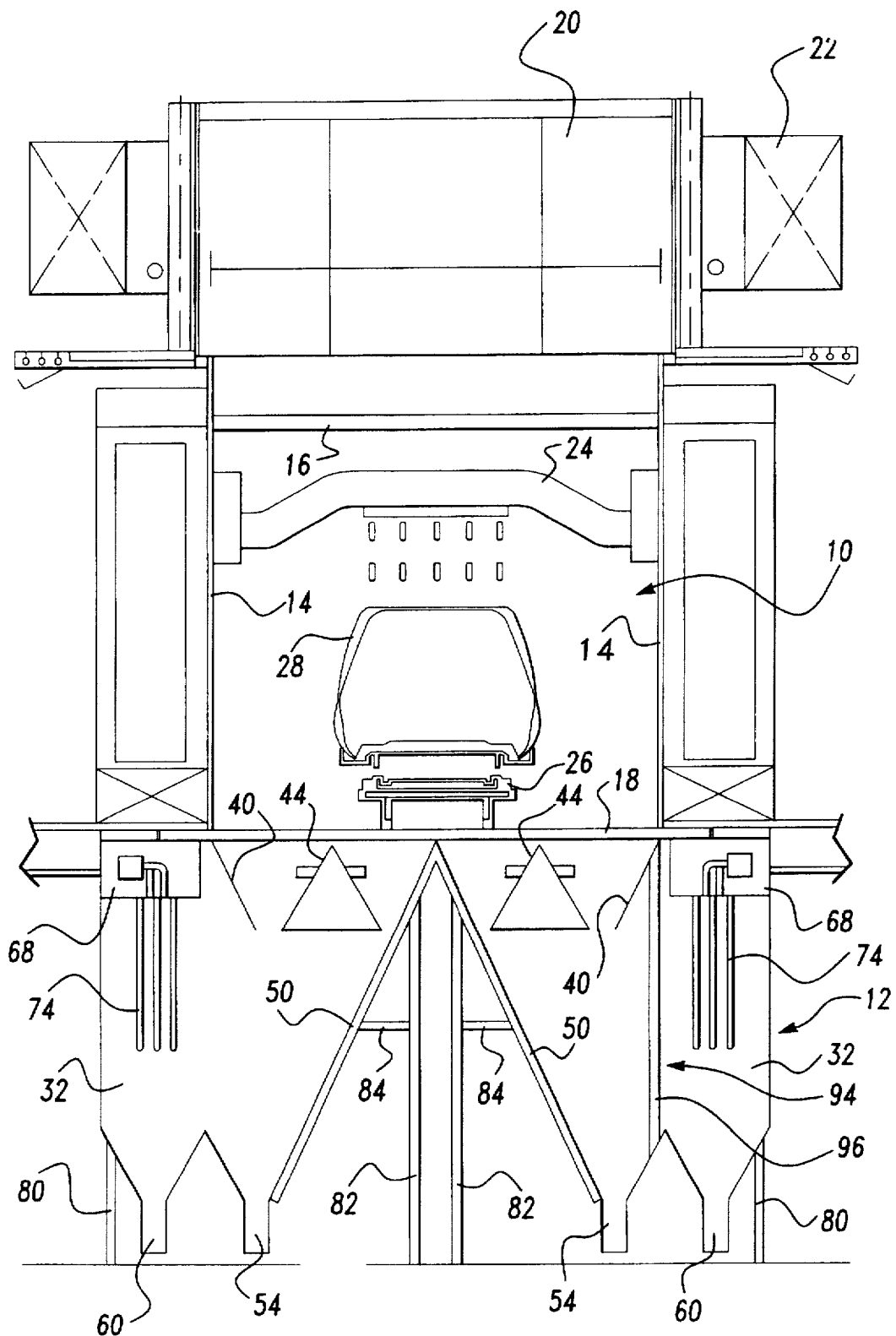
FIG. 1 is a lateral sectional view in the vicinity of a paint spray booth having an exhaust system arrangement in accordance with the principles of the present invention.

The present invention relates to an integrated powder collection system for paint spray booths. With reference to FIG. 1, a paint spray booth 10 is shown with an integrated powder collection system 12 according to the present invention. Paint spray booth 10 includes a pair of sidewalls 14 and a ceiling 16 which extends across the top of paint spray booth 10. A grated floor 18 is provided at the bottom of the paint spray booth 10. Grated floor 18 includes openings which allow the passage of powder overspray and air. A plenum 20 is disposed above ceiling 16 and is connected to an air inlet duct 22. Plenum 20 and the remaining air inlet system can be any conventional system and will not be further described herein.

A paint spray mechanism 24 is provided above a conveyer 26. Conveyer 26 extends longitudinally through paint spray booth 10. Conveyer 26 carries objects such as automobile bodies 28, through the paint spray booth 10 during a painting operation. Paint spray mechanism 24 and conveyer 26 can be of any conventional type.

The powder collection system 12 shown in FIG. 1 includes a pair of integrated powder collection modules 32 which are disposed beneath grated floor 18 of paint spray booth 10. Powder collection modules 32 are preferably arranged in two columns with one powder collection module 32 disposed on each side of the center axis of paint spray booth 10. A plurality of powder collection modules 32 are also preferably aligned in a longitudinal direction underneath the entire paint application zone of paint spray booth 10.

Figure 3:
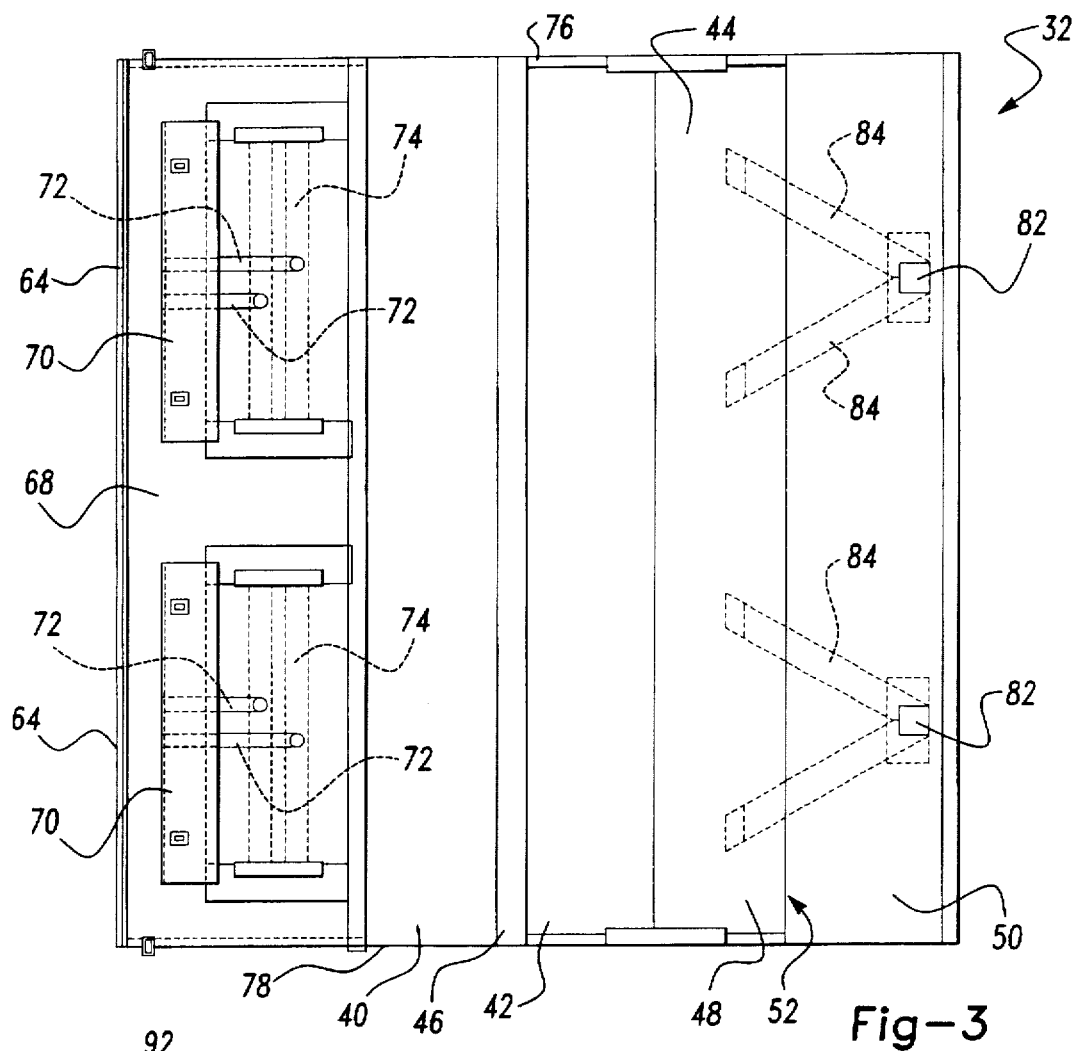
FIG. 3 is a top view of the integrated powder collection system shown in FIG. 2.
Figure 7:
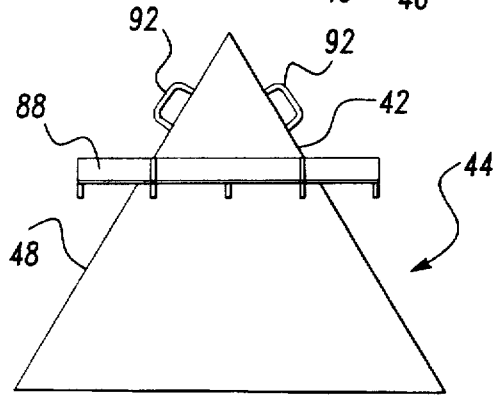
FIG. 7 is a side view of the interior deflection member shown in FIG. 5.
Figure 4:
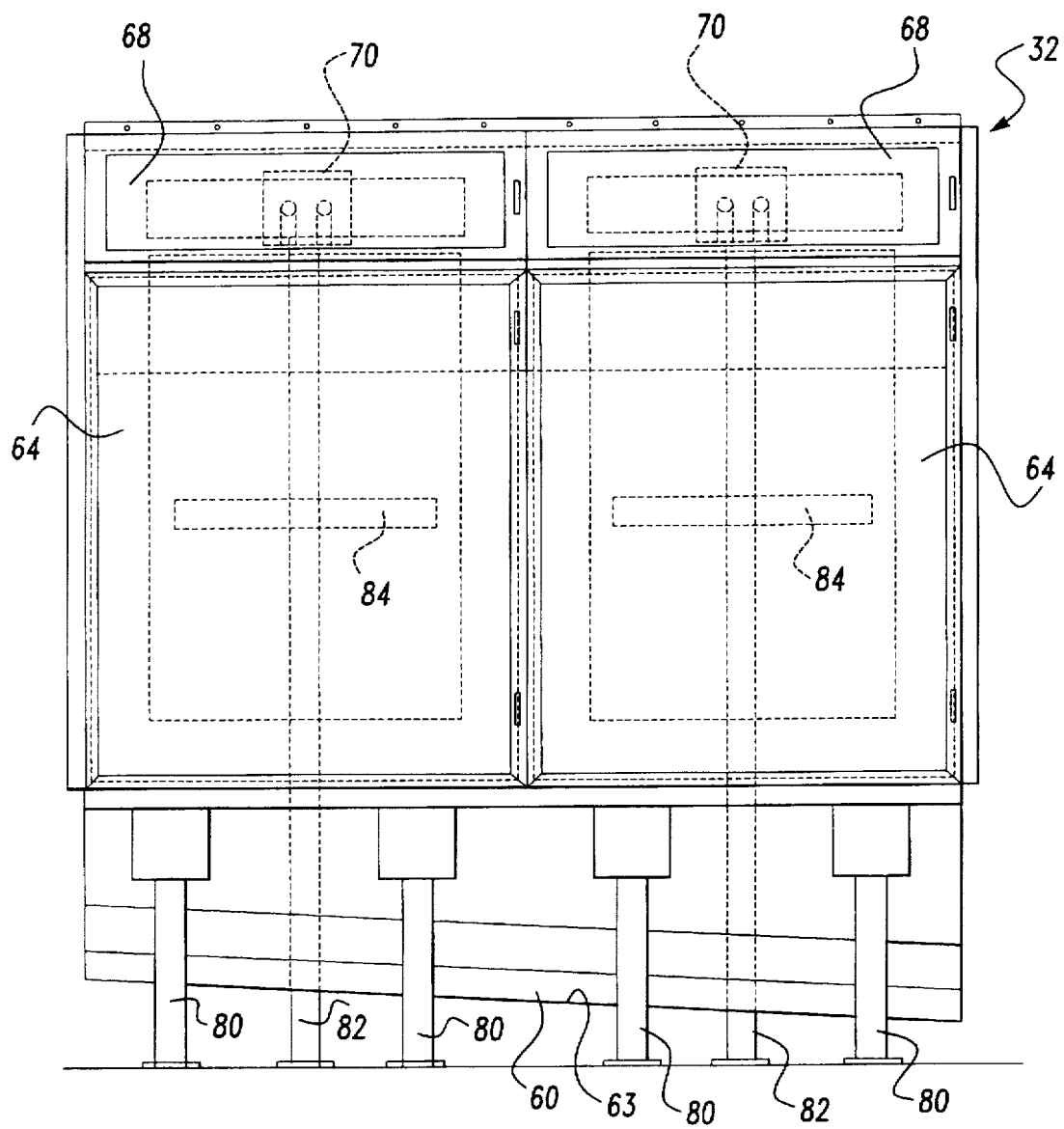
FIG. 4 is a side view of the integrated powder collection system shown in FIG. 2.

With reference to FIGS. 2-4, powder collection module 32 will be described in detail. With particular reference to FIG. 2, powder collection modules 32 include a pair of inlet openings 36, 38. Inlet opening 36 is defined by an interior deflection panel 40 and a first deflection surface 42 of an interior deflection element 44 of substantially triangular cross section. A longitudinal slot 46 is provided between interior deflection panel 40 and deflection surface 42 at the bottom of inlet opening 36. Interior deflection element 44 is provided with a second deflection surface 48 which defines the second inlet opening 38 along with an angled deflection panel 50. A longitudinal slot 52 is disposed between second deflection surface 48 and angled deflection panel 50 at the bottom of inlet opening 38.

An air slide 54 is provided at the bottom of angled deflection panel 50. A first inside collector panel 56 is disposed on a side of air slide 54 opposite to angled deflection panel 50. A second inside collector panel 58 is provided adjacent to first inside collector panel 56. Second inside collector panel 58 has a second air slide 60 disposed at a bottom portion thereof. A sloped collector bottom panel 62 is provided on a side of second air slide 60 opposite to panel 58. The air slides 54 and 60 are provided with a sloped surface 63 having an air supply which passes upward through the sloped surface 63 which prevents the powder overspray from settling on the sloped surface 63 and causes the powder to travel down the sloped surface 63.

A pair of access doors 64 are provided above sloped collector bottom panel 62. A plenum box assembly 68 is provided adjacent to interior deflection panel 40 and above access doors 64. Plenum box assembly 68 includes a vacuum source such as pulsed valve tank assembly 70 and a distribution manifold assembly 72. A filter cassette 74 is suspended below plenum box assembly 68. Filter cassette 74 is disposed laterally to a side of a space defined vertically below longitudinal slots 46 and 52. Filter cassette 74 is preferably a HERDING™ filter cassette.

With reference to FIG. 3, a top view of powder collection module 32 is shown provided with longitudinal end walls 76, 78. Also, as can be seen, plenum box assembly 68 includes two pulsed valve tank assemblies 70, two distribution manifold assemblies 72, and two filter cassettes 74.

With reference to FIG. 4, powder collection module 32 is shown supported on a first side by a plurality of square tubes 80 and on a second side by square tubes 82. Square tubes 82 are provided with brace members 84, best shown in FIG. 1, which extend from square tubes 82 to support angled deflection panel 50.

Figure 8:
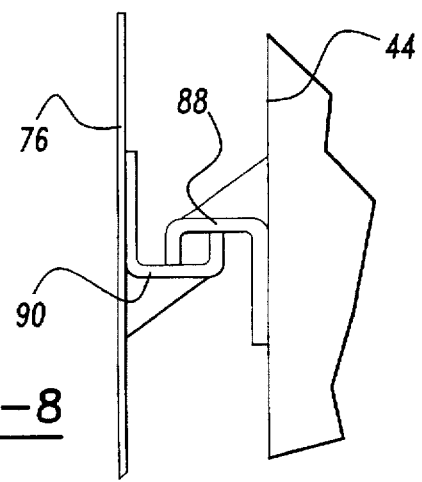
FIG. 8 is a detailed view of the mounting bracket for supporting the interior deflection member according to the principles of the present invention.

With reference to FIGS. 5-8, interior deflection element 44 will be described in greater detail. As discussed above, interior deflection element 44 is of substantially triangular cross section and includes deflection surfaces 42 and 48 which are disposed at approximately 60° relative to one another. Interior deflection element 44 is also provided with brackets 88 at each longitudinal end thereof. The brackets 88 are supported by corresponding wall brackets 90 which are mounted on module sidewalls 76 and 78 as shown in FIG. 8. Interior deflection element 44 is also provided with U-shaped rod members 92 which are provided for adjusting the lateral position of interior deflection element 44 so that longitudinal slots 46 and 52 can be adjusted in diameter.

With reference to FIGS. 1 and 2, the operation of the integrated powder collection system 12 according to the present invention will be described. During a painting operation, paint spray mechanism 24 is operated to apply paint to the automobile bodies 28 which are carried through paint spray booth 10 by conveyor 26. In order to ventilate the paint overspray from the booth 10, air is drawn inward through air inlet duct 22 into plenum 20 and through ceiling 16. The application of air pressure from the plenum 20 through ceiling 16 causes paint overspray, mixed with air which passes through the ceiling, to pass through grated floor 18 of paint spray booth 10. The paint overspray and air which passes through grated floor 18 also passes through inlet openings 36 and 38 and through longitudinal slots 46 and 52 of powder collection modules 32. As the mixed powder overspray and air passes through longitudinal slots 46 and 52, the air is drawn toward the filter cassette 74, as shown by arrows A and B, by the pulsed vacuum force of the pulse valve tank assembly. Because of gravity, most of the paint overspray will fall downward, in a direction indicated by arrows C and D, through a space defined vertically below the longitudinal slots 46 and 52 and along the slope of the angled deflection panel 50 which will guide the paint overspray toward air slide 54. The air which is drawn through longitudinal slots 46 and 52 is not affected by gravity and is therefore drawn in a lateral direction by the vacuum force of the pulse valve tank assembly 70 so that the air passes through filter cassettes 74 and is exhausted.

The filter cassette 74 filters any remaining powder overspray particles from the air which passes through the filter cassette 74. The pulse valve tank assembly 70 provides a pulsed vacuum which allows the paint overspray particles which are trapped by the filter cassette to fall from filter cassette 74 during an interruption pulse in the vacuum. Particles which fall from filter cassette 74 generally fall in a direction indicated by arrow E, against second inside collector panel 58 and sloped collector bottom panel 62 which direct the particles to second air slide 60.

It should be understood that the use of first and second air slides 54 and 60 is not required. Instead, a single air slide may be utilized. However, it has been found advantageous to provide two air slides in order to reduce the overall height of the powder collection module 32 since the length of the angled deflection panel 50 can be reduced. Each of the sloped surfaces of powder collection module 32 are preferably at a 60° angle from horizontal.

As shown in the right-hand powder collection module 32 of FIG. 1, the powder collection modules 32 may be provided with a baffle 94 between longitudinal slots 46 and 52 and filter cassettes 74 for preventing direct horizontal travel of powder overspray which passes through longitudinal slots 46 and 52. Baffle 94 includes a plurality of angled slats 96 which force air passing through baffle 94 to travel slightly upward in order pass between slats 96. Thus, the powder overspray which is subject to gravity forces is more likely to fall downward toward air slide 54 instead of traveling upward between slats 96 of baffle 94.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A powder collection system for a paint spray booth having a floor through which overspray and air are exhausted, comprising:

a pair of integrated powder collection modules disposed side-by-side beneath the floor generally on opposite sides of a longitudinal centerline of an area in which an article is painted within the spray booth, each of said integrated powder collection modules including:

at least two sloped surfaces extending generally from said floor for defining at least one longitudinal slot opening into a chamber;

at least longitudinal air slide disposed in a bottom portion of said chamber;

a filter cartridge disposed in said chamber, said filter cartridge being located laterally to one side of a space defined vertically below said at least one longitudinal slot; and a vacuum source connected to said filter cartridge.

2. The powder collection system according to claim 1, wherein said at least two sloped surfaces of said integrated powder collection modules include an angled deflection panel extending generally from said floor to said at least one longitudinal air slide, and an interior sloped surface which extends generally from said floor toward said angled deflection panel to define said at least one longitudinal slot.

3. The powder collection system according to claim 1, wherein said filter cassettes of said integrated powder collection modules are suspended below said vacuum source.

4. The powder collection system according to claim 3, wherein said integrated powder collection modules include a second longitudinal air slide disposed below said filter cassette.

5. The powder collection system according to claim 1, wherein said vacuum source of said integrated powder collection modules draws pulses of air through said filter cassettes.

6. The powder collection system according to claim 1, wherein said integrated powder collection modules further include a baffle between said at least one longitudinal slot and said filter cassette for preventing direct horizontal travel of powder which passes through said at least one slot.

7. A powder collection system for paint spray booths having a floor through which overspray and air are exhausted, comprising:

a collection chamber disposed beneath the floor and having an opening in an upper portion thereof;

an interior deflection triangular member including first and second angled deflection panels disposed in said opening in said collection chamber, wherein said first angled deflection panel defines a first longitudinal slot with a third angled deflection panel adjacent to said first angled deflection panel and said second angled deflection panel defines a second longitudinal slot with a fourth angled deflection panel adjacent to said second angled deflection panel, wherein said first and second longitudinal slots open into said collection chamber;

at least one longitudinal air slide disposed in a bottom of said collection chamber beneath said first and second longitudinal slots;

a filter cartridge disposed in said collection chamber, said filter cartridge being located laterally to one side of a space defined vertically below said first and second longitudinal slots; and a vacuum source connected to said filter cassette;

wherein said interior deflection triangular member is adjustably supported for lateral movement in said opening for adjusting a width of said first and second longitudinal slots.

8. The powder collection system according to claim 7, wherein said third angled deflection panel extends generally from said floor to said at least one longitudinal air slide.

9. The powder collection system according to claim 7, wherein said filter cassette is provided above a second longitudinal air slide.

10. The powder collection system according to claim 7, wherein said vacuum source draws pulses of air through said filter cassette.

11. The powder collection system according to claim 7, further comprising a baffle between said first and second longitudinal slots and said filter cassette for preventing direct horizontal travel of powder which passes through said first and second longitudinal slots.

* * * * *

UNITED STATES PATENT AND TRADEMARK OFFICE
CERTIFICATE OF CORRECTION

PATENT NO. : 5,782,943
DATED : July 21, 1998
INVENTOR(S) : David E. O'Ryan et al.

It is certified that error appears in the above-identified patent and that said Letters Patent is hereby corrected as shown below:

Column 1, Line 25, "though" should be --through--.

Column 5, Line 5, after "order" insert --to--.

Column 5, Line 27, Claim 1, after "least" insert --one--.

Signed and Sealed this

Twenty-second Day of December, 1998

Attest:

BRUCE LEHMAN

*Attesting Officer*    *Commissioner of Patents and Trademarks*